April 29, 1958     H. F. LORENZ     2,832,274
PHOTOGRAPHIC CAMERA

Filed Feb. 3, 1955     2 Sheets-Sheet 1

INVENTOR.
HENRY F. LORENZ
BY Gregory S. Dolgorukov
ATTORNEY.

April 29, 1958     H. F. LORENZ     2,832,274
PHOTOGRAPHIC CAMERA
Filed Feb. 3, 1955     2 Sheets-Sheet 2
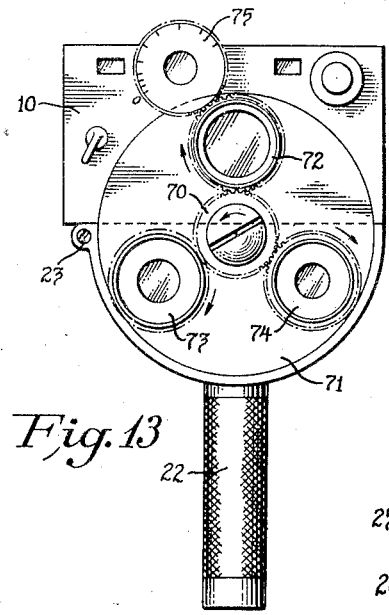
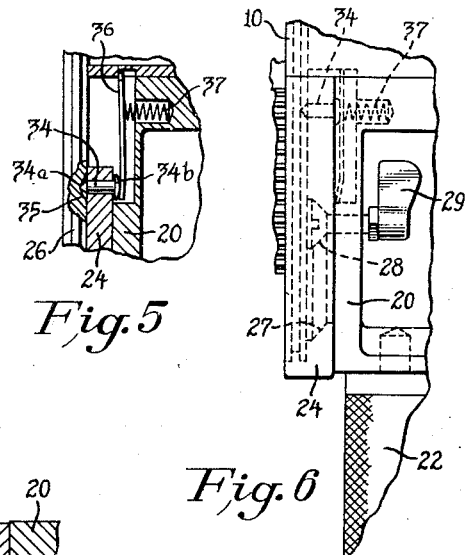
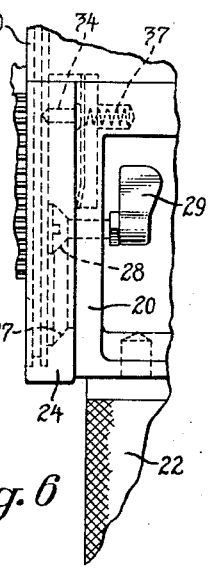
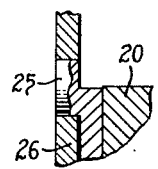
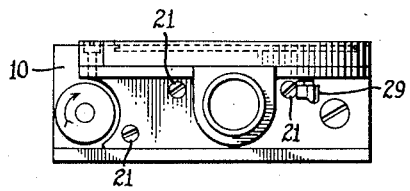
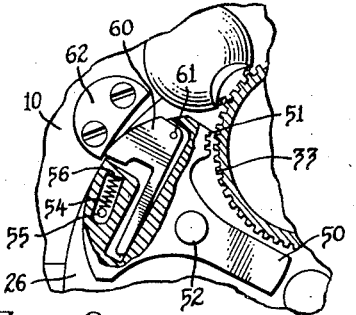
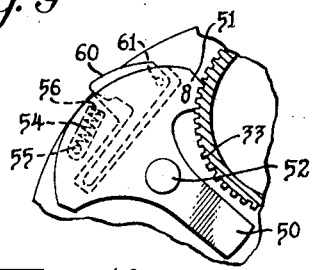
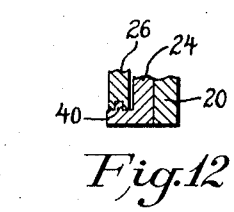
*INVENTOR.*
HENRY F. LORENZ
BY
*ATTORNEY.*

United States Patent Office 2,832,274
Patented Apr. 29, 1958

2,832,274

PHOTOGRAPHIC CAMERA

Henry F. Lorenz, Royal Oak, Mich.

Application February 3, 1955, Serial No. 485,983

5 Claims. (Cl. 95—45)

This invention relates to photography and more particularly to an improved photographic camera provided with a lens turret.

Considerable interest of those engaged in photography, both amateur and professional, has been centered, within recent years, on photographing various rare objects and unrehearsed or natural scenes of striking interest, such for instance, as unrehearsed scenes with children, animals in their natural habitat, scenes and occurances of public interest as news, scientific phenomena, and the like. While such scenes or objects may present exceedingly interesting subjects for photography, many of them are of very short duration and they may change or completely disappear within a few seconds. In fact, it is precisely such rare and quickly disappearing objects of phenomena that present particularly interesting and challenging subjects for a photographer. Moreover, clear photographs of some rare objects or scenes may be of a great monetary value. Photographing such scenes when they appear or are confronted suddenly, obviously requires bringing the camera into readiness and focusing it on the subject in the least possible time. While considerable progress has been made in the construction of cameras to enable the operator to bring his camera into readiness in a very short time, there is still left much room for improvement. In many instances the subject changes position or completely disappears before the best now available camera can be brought into readiness, and much valuable subject-matter found at great effort and expense is completely lost. In many cases difference of a few seconds only in such readying time, means the difference between success and failure. Therefore, the search for improving cameras in such a manner as to enable its user to bring the camera in readiness with a proper lens in position and focused, has been very strenuous for a number of years.

There have come within recent years into rather wide use, photographic cameras in which the lens is focused with the aid of a graduated rotatable range finder, rotation of which focuses the lens for a desired distance readable on the dial of the range finder. Such construction greatly facilitates and speeds up focusing of the camera. The range finder of such a camera is usually connected with the lens through a gear train drivingly connecting the lens with the range finder in a positive manner and, therefore, ensuring their proper synchronization. However, such cameras because of the above described construction have been limited to the use of a single lens, with lenses of special nature, such as telephoto and wide-angle lenses being carried as spares, with the view that the standard lens may be removed and replaced by a special lens when needed. Conditions of photography often require use of special lenses as indispensable for securing a proper picture, and the need for a special lens may arise suddenly. While it is possible to substitute such lenses for the standard lenses in the camera, such operation requires considerable time, place to work at and special lens immediately available. Therefore, disappearance of the subject during changing of lenses has been a common occurrence with such cameras. As a result there have appeared cameras with turret lenses in which a plurality of lenses are mounted on a rotatable platform, enabling the operator to bring any of the lenses into a position along the optical axis of the camera.

While such turret lens cameras have solved the problem of changing lenses, they cause return to focusing of the lens by direct manipulation thereof, i. e., destroying the advantage of focusing with the use of a graduated range finder. Such turret cameras proved to be very useful in many conditions by offering selection of a plurality of lenses, but they have attained little improvement with respect to bringing cameras into readiness for photographing quickly disappearing subjects. The latter condition results from the fact that while such turret cameras gained some time in changing lenses, they introduced delay by requiring focusing of registering lens in the old and slow manner.

One of the objects of the present invention is to provide an improved photographic camera whereby the above difficulties and the disadvantages are overcome and largely eliminated, and whereby there is produced a camera which combines in itself the advantages of cameras with focusing of lenses from the graduated range finder, as well as the advantages of the turret lens cameras, but without introducing the difficulties peculiar to either as explained above.

Another object of the present invention is to provide an improved photographic camera of the turret type and including means for focusing any of its lenses through a positive drive from a graduated range finder.

A still further object of the present invention is to provide an improved photographic camera of the turret type in which the registering lens is automatically brought into positive driving connection with the graduated range finder, and out of said connection as it is moved out of register position.

A still further object of the present invention is to provide an improved photographic camera of the nature specified in the preceding paragraph, improved means being provided therein whereby the registering lens is locked from rotation as it is being moved out of register position, whereby its synchronization with the range finder is preserved in its out-of-register position and until it is again brought into register.

A still further object of the present invention is to provide an improved photographic camera of the above specified nature, in which locking of the lenses as they are moved out of register position and unlocking the same for focusing rotation as they are moved into register position and driving connection with the range finder, is attained automatically.

A still further object of the present invention is to provide an improved photographic camera of the turret type in which the registering lens can be brought into one of the two extreme positions of its focusing range for moving out of register position without interferences with the structure of the camera by protruding too far inwardly thereof, as may be the case with wide-angled lenses, or by offering photographic interference with the registering lens by protruding too far forward, as in cases of long telephoto lenses.

A still further object of the present invention is to provide a lens turret of such a construction that it can be manufactured as an attachment for existing conventional cameras and incorporated therein with only a few changes in such cameras.

It is an added object of the present invention to provide an improved photographic camera of the turret type which is simple and rugged in construction, dependable in operation, is relatively inexpensive to manufacture and to service.

Further objects and advantages of this invention will be apparent from the following description and appended claims, reference being had to the accompanying drawings forming a part of this specification, wherein like reference characters designate corresponding parts in the several views.

Fig. 5 is a fragmentary sectional view illustrating the spring pressed stop locating the rotatable disc of the turret in one of its three positions.

Fig. 6 is a view similar in part to Fig. 5 and showing the turret-locking mechanism.

Fig. 7 is a fragmentary sectional view taken in the direction of the arrows on the section plane passing through the section line 7—7 of Fig. 2.

Fig. 8 is a bottom view of the camera.

Fig. 9 is a view, partly in section, showing construction of one of the articulated gear segments and positions of its operative parts when the gear portion of the segment is in driving connection with the range finder and out of engagement with the gear of the lens.

Fig. 10 is a view similar in part to Fig. 9 but showing the gear segment moved by operation of its spring into locking engagement with the lens gear.

Fig. 11 is a fragmentary sectional view taken in the direction of the arrows on the section plane passing through the line 11—11 of Fig. 2.

Fig. 12 is a fragmentary sectional view taken in the direction of the arrows on the section plane passing through the section line 12—12 of Fig. 2.

Fig. 13 shows a modified construction embodying the invention.

Figure 1:
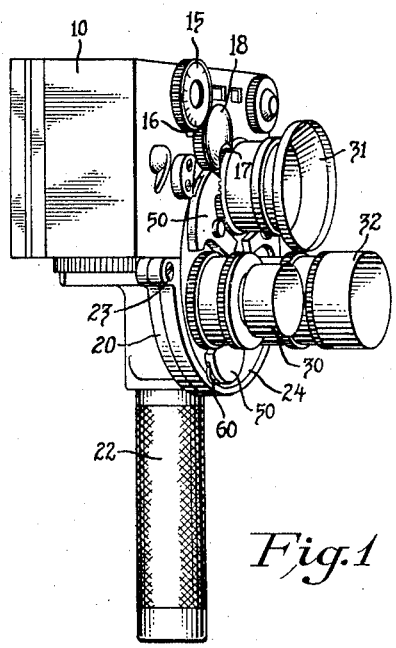
Fig. 1 is a perspective show showing a photographic camera embodying the present invention.

It is to be understood that the invention is not limited in its application to the details of construction and arrangement of parts illustrated in the accompanying drawings, since the invention is capable of other embodiments and of being practiced or carried out in various ways. Also it is to be understood that the phraseology and terminology employed herein is for the purpose of description and not of limitation.

In accordance with the invention I provide a photographic camera having a turret with a plurality of lenses mounted thereon. Instead of mounting the turret directly on the casing of the camera, I mount it on a support on which the turret may rotate around its axis, with the support being connected pivotally or in any other suitable manner to permit the turret to be moved bodily for a desired distance in order to disengage the gear of the lens in register from the range finder. The turret may also slide in straight slides instead of swinging on a hinge or pivot. By virtue of such an expedient, I permit the turret to be rotated for bringing the desired lens into a position from which it may be moved into a register position, without interference from the driving connection of the range finder with the lens. In order to preserve synchronization of the lens with the range finder, I provide means automatically locking the lens from rotation as the turret moves bodily away from its engagement or retracted position.

Moreover, I provide means unlocking the lens and releasing it for rotation by the range finder drive, when the turret is moved bodily from its extended position into its engagement or retracted position. Stop means are provided to limit extending movement of the turret. A frictional lock is provided to lock the turret in its retracted position. I also provide spring-pressed locating or indexing means for locating the rotatable disc of the turret in any of its operative positions. I have found that for proper operation of the turret, as well as for eliminating photographic interference of the telephoto lens with the wide angle lens, it is desirable that the telephoto lens be brought to infinity setting with the use of the range finder before moving it out of register position, thus ensuring that the telephoto lens will not protrude too far forwardly and get into the picture of the wide angle lens. On the other hand, it is desired that the wide angle lens and the standard lens be brought to shortest focusing setting before they are moved out of their respective register positions, in order to prevent interference of these lenses with the camera or turret structure. In order to produce desired operation and to remind the user of such condition, I provide corresponding markings on the camera.

In the drawings there is shown, by way of example, a photographic camera embodying the present invention. The camera comprises a non-expanding casing 10 adapted to have a lens of the telescoping tube type brought into a "register position," i. e., a position in which the axis of the lens coincides with the optical axis of the camera. The details of the casing construction do not form a part of the present invention and need not be described herein beyond what is necessary for understanding of the present invention. Expanding and contracting of the telescoping tube of the registering lens is effected by the graduated range finder 15 mounted for rotation on the casing 10. A marker 16 is provided on the casing adjacent the range finder to indicate focusing position thereof. An idler gear 17 meshing with the range finder 15 and provided with a cap 18 is also mounted on the casing 10 and is adapted to be in mesh with the gear of the registering lens. The driving connection between the range finder 15 and the gear of the lens is well known in the art.

In accordance with the invention I provide a rotatable turret which is also adapted to be moved bodily into engagement or retracted position and away therefrom, i. e., into an extended position and out of the same. In the present embodiment of the invention in order to provide such a turret, I provide a base bracket 20 secured to the casing 10 at the underside thereof with the aid of screws 21, see Fig. 8, or in any other suitable manner. A handle 22 may be provided and secured to the bracket 20. To the bracket 20 there is hingedly connected, as indicated at 23, a swinging support 24 to which is pivotally connected as at 25, a turret disc 26 adapted to rotate on said support around its axis passing through the center of the hinge connection 25, and to be moved bodily by revolving around the axis passing through the center of the connection 23. A slot 27 provided in the support 24 and cooperating with a screw 28 engaging with its threaded shank the tapped hole in the bracket 20 operates to provide a stop for the extending movement of the support 24. A handle 29 secured to the end of the screw 28 protruding through the bracket 20 enables the user to turn the screw 28 causing its head to press the support 24 against the bracket 20 for a frictional locking of the support and therefore of the entire turret assembly in its register position. Turning of the handle 29 in the opposite direction releases the pressure of the screw head and, therefore, of the support 24 on the bracket 20, thereby unlocking the support from the bracket for moving the support and therefore the entire turret bodily into its extended position.

The turret disc 26 is rotatable on the support 24 around the axis of the pivotal connection 25, as mentioned. A plurality of lenses of any suitable nature are mounted on the disc 26 at such a distance from the center thereof that when the support 24 and the disc 26 carried thereby are moved inwardly into the registering position the axis of the registering lens coincides with the optical axis of the camera and its gear meshes with the idler gear 17. In the present embodiment of the invention there are mounted on the disc 26 at internally threaded apertures provided therein, three lenses; a standard lens 30, a wide angle lens 31, and a telephoto lens 32. Such number of lenses, as well as their specific nature, stated above, are only exemplary, and the invention is not limited to the above number of lenses or to the lenses of the above specified nature.

Figure 2:
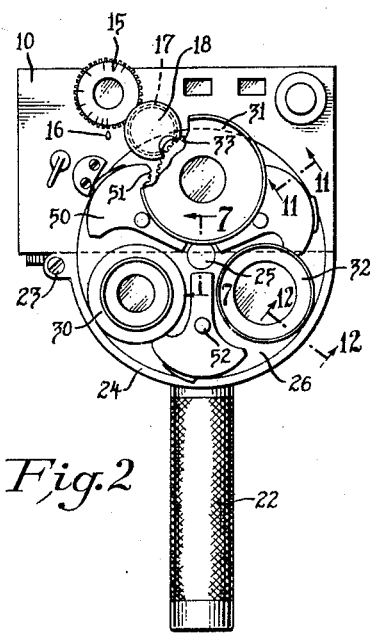
Fig. 2 is a front view of the camera of Fig. 1, with the wide angle lens being shown in registry position and, therefore, in positive driving connection with the range finder of the camera.

Referring now to Fig. 2, it will now be seen that in the position of the turret illustrated therein, the wide angle lens 31 thereof is in register position, with its gear 33 meshing with the idler gear 17. It will be also seen in view of the foregoing that in such a position, the handle 29 being presumed to have been turned to lock the turret bodily, turning the range finder 15 operates to focus the lens in a manner similar to that of stationary lenses.

When it is desired to use some other lens such, for instance, as the telephoto lens 32, the range finder is set at one of the extremities of its focusing range, preferably at its shortest focusing distance for the reasons explained later. Thereupon, the handle 29 is turned to unlock the support, and the same is moved into its extended position shown in Fig. 3. It can be seen that in such a position of the support 24, the gear 33 of the lens 31 is out of mesh with the idler gear 17 and, therefore, the disc 26 can be turned in either direction without interference from the idler gear 17. In order to bring the telephoto lens 32 into the top position on the disc 26, the disc is rotated in a counter-clockwise direction through 120 degrees until the lens 32 comes into the top position.

Means are provided to locate each of the three lenses in such a position. While such means may be of any desired form, such as in the form of two lines brought into register, I prefer to use the device illustrated in Fig. 5, which enables the user to locate the lens in a proper position by feel and automatically and, therefore, without dependence on sufficiency of light, and without the necessity of turning the camera in such a way as to have the lines visible.

In accordance with the invention, the support 24 is provided with a locking pin 34 sliding therein and having a pointed end 34a and a head 34b. The disc 26 is provided with three indentations 35, only one of such indentations being shown in the drawing, spaced at angles of 120 degrees from each other. The thin plate 36 aided by the compression coil spring 37 exerts pressure on the head 34b of the pin 34, maintaining it in the position shown in Fig. 5. The form of the indentation 35 is such that when turning effort is exerted on the disc 26 the walls of the indentation operate to push the lock pin 34 to the right, in opposition to the sprng 37, whereupon the disc 26 can be rotated until the next indentation 35 comes in register with the end 34a of the locking pin 34 causing said end 34a to snap into such next indentation and thus locating the disc 26 and, therefore, the lens in a proper position.

When the telephoto lens 32 is brought in its top position and is located thereat by the above described action of the pin 34, the turret is now ready to be moved into a position to bring the telephoto lens 32 in its register position and its gear 38 in mesh with the idler gear 17. At this point it is necessary to appreciate that before the gear 38 of the telephoto lens and the idler gear 17 are put into mesh, it is necessary to have the telephoto lens be set for the same focusing distance as the range finder 15. If the telephoto lens 32 is set at its shortest focusing distance, it could be now moved into mesh with the idler 17, turret be locked in place, and the lens be focused on the subject with the aid of the range finder 15. Under certain conditions it is possible to have all of the lenses being brought into mesh with the idler gear 17, with said lenses set for the shortest focusing distance. However, a preferable arrangement in this respect is described later in order not to complicate the explanation of the basic operation of the device by this particular detail.

Bringing of the standard lens into register is accomplished in the same manner and need not be described in detail. In order to secure proper alignment of the disc 26, the same may be recessed or grooved around its periphery for the entry of the peripheral tongue or ridge 40 provided on the support 24, see Fig. 12, as well as of an arcuate guide 41 provided on the casing 10, see Fig. 11.

Figure 3:
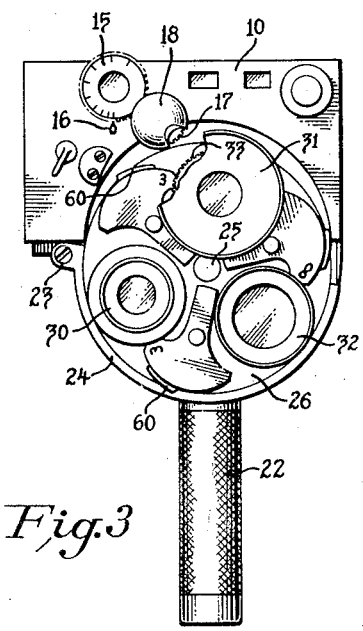
Fig. 3 is a view similar in part to Fig. 2 but showing the turret moved bodily into its extended position in order to disconnect the wide angle lens from the range finder for rotation of the lenses.

In order to ensure proper synchronization of the lens with the range finder in spite of the fact that positive driving connection between them is destroyed every time the lens is moved out of its registry position, means are provided to lock the lens from rotation as it is being moved from its register position. Such means may be manually operated. Various types of such manual locks may be used. I prefer to use automatically operated locks. In the present embodiment of the invention said locks are exemplified by three hinged members or segments 50 each having a gear portion 51 provided thereon. There is one member 50 provided for each of the lenses. Each of said members 50 is hinged as shown at 52. Limited rotation of the member 50 around the hinged point 52 causes the gear segment 51 to go in and out of engagement with the lens gear such as 33, as is best shown in Figs. 10 and 11. A spring 54 housed within the recess provided on the underside of the member 50 has one of its ends bearing on the pin 55 provided on the disc 26, while its other end bears on the member 50 as indicated at 56. The spring 54 is under compression and, therefore, its end abuts on the pin 55 which is stationary with respect to the member 50. The spring 54, unless it is overcome by extraneous force, always tends to maintain the gear portion 51 of the member 50 in engagement with its respective lens gear. Fig. 3 shows the camera with its turret moved into its extended position, and with the members 50 in engagement with the gear 33 of the lens 31. The segment members used for the remaining two lenses are identical in construction and, therefore, need not be described separately or given separate identifying numerals.

It will be noted that when the turrets is moved into its extended position, all of the members 50 are in engagement with their respective lens gears and, therefore, all of the gears are locked from rotation.

Means are provided whereby the member 50 is actuated to have its gear portion 51 moved out of engagement with the respective lens gear, when the respective lens is moved into its registering position and to have its gear come into mesh with the idler gear 17. In the present embodiment of the invention said means are exemplified by a cam 60 hinged on the disc 26 as shown at 61. When the turret is moved bodily to have the lens come into the register position, the cam 60 contacts the cam plate 62 provided on the camera casing 10, and moves the member 50 in opposition to the action of its spring 54 bearing on the stationary pin 55, out of engagement with its respective lens gear. Such a condition is shown in Figs. 2 and 9. By providing the cam 60 in the form illustrated in the drawing rather than the form of a mere stop, I produce a relatively large movement of the segment for very short movement of the cam and ensure that the gear of the turret is unlocked before it meshes with the idler 17. Moreover, rotation of the turret without interference of the cam with the idler gear is also ensured thereby.

Figure 4:
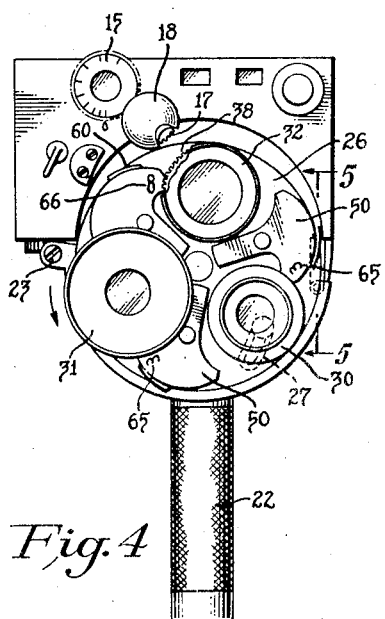
Fig. 4 is a view similar in part to Fig. 3 but showing the turret turned on its axis counter-clockwise through a 120 degree angle in order to bring the telephoto lens to the top position on the turret, i. e., in a position from which the lens can be moved into the register position by swinging the turret bodily into its original or retracted position.

I have found that it is desirable to have the standard lens and the wide angle lens brought to the shortest focusing distances before moving them out of their respective register positions. Such a condition is particularly desired with respect to the wide angle lens, since otherwise it may protrude too far inwardly of the camera structure and interfere with rotation of the turret disc. On the other hand, it is desired to have the telephoto lens set at infinity, i. e. to have it contracted to its minimum length, since otherwise the telephoto lens may protrude so far forward as to get in the picture field of the wide angle lens when the latter is in register position. In order to indicate such condition, I provide corresponding marks adjacent the lenses, preferably on the respective members 50, to indicate setting of the respective lenses for moving out of register position. With the shortest focusing distance being 3 feet, I apply the numeral 3 to the members 50 of the standard lens and of the wide angle lens as indicated at 65, and infinity sign to the member 50 of the telephoto lens as indicated at 66 in Fig. 4. It should be understood that if a mistake is made, the user can easily detect and correct it by moving the lens out of register position and setting it by hand using the focusing scale arrow usually marked on the lens tube.

It will also be understood that a single central gear in constant mesh with the gears of all of the lenses may be used instead of the locking means described above. With such a construction, focusing of the registering lens will cause the non-registering lenses to have the same focusing movements. Such a construction requires application of considerable force to rotate the range finder and may not be desirable with small range finders, such as may be found on cameras already in use. However, where the range finder can be made large and mesh directly with the gear of the registering lens, the central gear construction may be preferred. Such a construction would enable to change lenses without any worry about their setting, and have a number of other important advantages.

One construction of this nature, embodying the present invention, is illustrated in Fig. 13, wherein the turret thereof is shown in its retracted or closed position. As can be appreciated from an examination of Fig. 13, the camera of this nature may be similar in the construction of its turret, arrangement of the lenses thereon, indexing or location means, locking of the turret, and connection providing for bodily movement of the turret to take the registering lens out of positive engagement with the range finder, and bring it back into such an engagement. The main difference between such camera construction and the one illustrated in Figs. 1–12 is found in the lens locking means.

In accordance with the invention, in the camera of this type all of its lenses mounted on the turret disc are interconnected by gear means for synchronized rotation. In the embodiment of Fig. 13, such construction is effected with the aid of the central gear 70 mounted at the center of the turret disc 71 and meshing with the gears 72, 73 and 74 of the three lenses mounted thereon. Thus, when one of the lenses is rotated in a desired direction, the other two lenses are simultaneously rotated in the same direction and reproduce focusing movements of the actuated lens. In other words, all of the lenses are always at the same setting. When the registering gear is in mesh with the range finder, as shown in Fig. 13, bringing the range finder to infinity will focus not only the registering lens but also the other two non-registering lenses also at infinity. If the range finder is brought to any intermediate setting, such for instance as 50 feet, all of the turret lenses will be focused also at 50 feet. Therefore, the turret may be moved bodily for changing lenses from any position of the finder. Thus, the construction is virtually foolproof and enables exceedingly quick changing of lenses. The only care to exercise is not to rotate the range finder when the turret is moved away.

In this construction in the process of focusing, all of the lenses are rotated at the same time and a much greater effort is required to be applied to the range finder. Therefore, it is desirable to make the range finder of as large a diameter as practicable, thus decreasing the required effort by improving the mechanical advantage at which the rotative effort is applied. Under some conditions it may be desirable to eliminate the idler gear completely and have a range finder, such as the range finder 75 in Fig. 13, mesh directly with the registering lens gear.

It will be appreciated that my improved turret lens assembly may be not only built into a camera as original equipment, but can also be designed and built for many existing cameras and incorporated therein as attachments without appreciable changes in the constructions of such cameras.

By virtue of the constructions described above, the objects of the present invention listed above and numerous additional advantages are attained.

I claim:

1. In a photographic camera, a casing, a rotatable turret having a plurality of lenses mounted thereon, said turret being adapted to bring each of said lenses into a registry position, a graduated disk range finder on said casing, a gear train disposed in one plane and connecting said range finder with the lens which is in registry position, means to disconnect said gear train for rotating the turret; and positive means automatically actuated, when said gear train is disconnected, to lock positively the respective lens from rotation when said lens is moved away from its registry position.

2. In a photographic camera, a casing, a rotatable turret having a plurality of lenses mounted thereon, said turret being adapted to bring each of said lenses into a registry position, a graduated disk range finder on said casing, a gear train disposed substantially in one plane and connecting said range finder with the lens which is in registry position, means for disconnecting said gear train for rotating the turret, and means automatically locking the registering lens from rotation as said gear train is disconnected and for unlocking the lens for focusing rotation as it is brought into registry position.

3. In a photographic camera, a casing, a rotatable turret having a plurality of lenses mounted thereon, each lens having thereon a gear rotatable for focusing, said turret being adapted when rotated to bring any one of said lenses selectively into the registry position, a graduated disk range finder of the gear type provided on said casing and adapted to come into driving connection with the gear of the lens in registry position, a support for said turret providing for rotation of the turret therein, an eccentric pivotal connection between said support and said casing to provide for moving the turret bodily and thus to disconnect the gear of the registering lens from the range finder; a plurality of gear segments, one for each of said lenses, mounted on said turrets, each of said segments being movable individually into engagements with the gears of its respective lenses to lock it from rotation when the lens is moved out of registry position and to release said gear when its lens is moved into registry position.

4. In a photographic camera, a case, a rotatable turret having a plurality of lenses mounted thereon, each lens having thereon a gear rotatable for focussing said turret being adapted when rotated to bring any one of said lenses selectively into the registry position, a graduated range finder of the gear type provided on said casing and adapted to come into driving connection with the gear of the lens in registry position, a support for said turret providing for rotation of the turret therein, an eccentric pivotal connection between said support and said casing to provide for moving the turret bodily and thus to disconnect the gear of the registering lens from the range finder; a plurality of gear segments, one for each of said lenses, mounted on said turret, each of said segments being movable individually into engagement with the gears of its respective lenses to lock it from rotation when the lens is moved out of registry position and to release said gear when its lens is moved into registry position and spring pressed cam means on each of said segments adapted to maintain the same in locking engagement with its respective lens gear, said cam means being adapted to contact the casing structure and to move the segment out of locking engagement with its lens gear when the same comes into driving arrangement with the range finder.

5. The invention defined in claim 4, and including a spring-pressed member locating the turret in each of its registry positions, and a screw lock for manually locking the turret in any registry position and to unlock said turret for rotating.

References Cited in the file of this patent

UNITED STATES PATENTS

| | | |
|---|---|---|
| 2,007,016 | Kubica | July 2, 1935 |
| 2,107,829 | Kuppenbender | Feb. 8, 1938 |
| 2,236,069 | Robinton | Mar. 25, 1941 |
| 2,640,777 | Fachman | June 2, 1953 |

FOREIGN PATENTS

| | | |
|---|---|---|
| 643,195 | Germany | Mar. 30, 1937 |
| 703,827 | Germany | Mar. 17, 1941 |